Patented Jan. 2, 1945

2,366,545

UNITED STATES PATENT OFFICE 2,366,545

PROCESSES FOR SWEETENING HYDROCARBON OILS

Clarence S. Morris, Coalinga, Calif., assignor to Petrolite Corporation, Ltd., Wilmington, Del., a corporation of Delaware No Drawing. Application December 8, 1943, Serial No. 513,645

22 Claims. (Cl. 196—33)

My invention relates to the sweetening of hydrocarbon oils and more particularly has reference to improvements in the conventional doctor treatment for the removal of mercaptans from light hydrocarbon distillates such as gasoline, naphtha, kerosene, benzine and petroleum oils in general.

It is a principal object of the invention to render the doctor treatment more rapid and economical and to produce sweetened distillates of unusually desirable properties.

The doctor treatment has long been applied to petroleum oils for the removal of mercaptans. It involves treatment of the oils with elementary sulfur and an aqueous alkaline solution of sodium plumbite, known as the "doctor solution". The plumbite solution effects a chemical reaction between the mercaptans and the elementary sulfur, resulting in the conversion of the mercaptans to dialkyl disulfides and also into some trisulfide, while the sulfur is converted mainly into sulfides, polysulfides, thiosulfates, etc.

In practicing the conventional doctor treatment, an excess of elementary sulfur is used to bring about a "break", a term used in the art to indicate the settling or subsidence point in the doctor treatment. That is to say, the amount of free sulfur used is in excess of the theoretical quantity required to convert the mercaptans into disulfides and other innocuous compounds, the excess serving to induce the "break" in the treatment. Such use of elementary sulfur to effect settling or subsidence results in the incorporation of sulfur into the distillate, with its attendant objections. Among these objections, in the case of gasoline, are poor inhibitor and tetraethyl lead susceptibility, lowered anti-knock value, increased corrosive action on metals, poor color and odor stability, and increased tendency to form gum.

Although doctor treatment in its many variations is well understood in the art, it may be well to emphasize, by a suitable reference, the circumstances and conditions attending a break and the difficulty of coagulating the colloidal black precipitate. As stated in Industrial & Engineering Chemistry, vol. 30, No. 11, Nov. 1938, p. 1276:

"Doctor plants differ in the way in which doctor solution and sulfur are mixed with the gasoline and the length of time they remain in contact. It is common practice to add the sulfur in gasoline solution before, at the same time as, or after the gasoline and doctor solutions are mixed. The mixing may be done by orifice plates, baffled pipes, pipes with right-angle bends, or mechanical mixing devices, and mixing time may vary from a few seconds to several minutes.

"When sulfur is added to a mixture of gasoline and doctor solution, the oil becomes orange-red in color; after a longer or shorter time, depending on the gasoline and the amount of sulfur added, the 'break' takes place, when the color disappears and a red-brown to black precipitate, usually called lead sulfide, forms and settles.

"In different plants, the break may be produced as the gasoline leaves the mixers or it may not occur until after the gasoline has entered the settling drum. If a plant has adequate mixing (the proper time of mixing will depend on the type of gasoline and somewhat on the degree of sourness), the gasoline may be allowed to break as it leaves the mixers, and the amount of sulfur required to do this will not be so great as to harm inhibitor susceptibility. However, if a plant has little mixing equipment (a common installation is three mixing nozzles in about six feet of line, which for most gasoline is much less mixing than is desirable), a break cannot be obtained in the mixers without using a considerable excess of sulfur, with consequent detriment to the inhibitor effectiveness. If, however, the break in such plants occurs in the first settler from three to fifteen minutes after the gasoline leaves the mixers, the results from an inhibitor standpoint will usually be satisfactory. But when the break occurs in the settler, the gasoline being no longer in contact with doctor solution, it tends to produce a finer precipitate, settling more slowly than when the gasoline is broken out while still in contact with doctor solution. As plants deficient in mixing equipment are also often lacking in settling capacity, the treater in such cases faces a serious dilemma. If he uses excess sulfur, his gasoline settles well but inhibitor susceptibility is poor; if sulfur is kept down, the gasoline breaks and settles slowly and lead sulfide leaves the plant suspended in the gasoline."

Thus, in actual practice, the present trend has been to continue to use sulfur as a break inducer, insofar that no universal and economic solution of the problem has been heretofore available. Some effort has been made to solve the problem by subsequent washing with aqueous solution, but this has resulted in attendant loss of expensive lead. Another approach to the problem concerned the use of sodium oleate, sodium resinate, sodium stearate, sodium palmitate, and other simple unmodified fatty materials as break inducers for replacing a part of the sulfur which is ordinarily used as a break inducer. It is not believed that such procedure is ordinarily applicable as a complete substitute for sulfur as a break inducer. Or, in other words, it is not believed that any attempt has been made to apply such process in instances where the amount of elementary sulfur represented only theoretical quantities and which would necessitate that the simple fatty materials, such as soap, be relied upon solely as the break inducer.

I have now found that certain acylated aminoalcohols possess the property of inducing a break in the doctor treatment and my invention involves their use, in the sweetening of sour oils by means of plumbite solution and elementary sulfur, to effect the settling or subsidence in the known sweetening process.

The reagents employed in the present process consist of acylated aminoalcohols in which an acyloxy radical derived from a detergent-forming acid having from 8 to 32 carbon atoms is joined to a basic nitrogen atom by a carbon atom chain, or a carbon atom chain which is interrupted at least once by an oxygen atom. The aminoalcohols may have more than one amino radical, or, for that matter, more than one basic amino radical. The compounds herein contemplated as break-inducers are well-known compounds and are produced by conventional procedures. Stated another way, the compounds herein contemplated are esters of aminoalcohols which may contain ether linkages as well as more than one amino nitrogen atom.

Reference to a basic amino nitrogen atom is used in its conventional sense. ("Unsaturated groups, or negative groups, if substituted for one or more of the hydrogens of ammonia, reduce the basicity of the nitrogen atom to a remarkable degree. In general, the presence of one negative group linked on the nitrogen is sufficient to destroy the ordinary basic properties." Textbook of Organic Chemistry, Richter, second edition, page 253.)

Reference to an amine and the subsequent amino compounds is intended to include the salts and the anhydro base as well as the hydrated base, since both obviously are present when an aqueous system is being subjected to the reagent or when the reagent is used as a water solution or dispersion. ("In an aqueous solution of the amine, the anhydro base, R—NH₂, the hydrated base, R—NH₃—OH, and the two ions are all present." Richter, s. v., page 252.)

As has been previously stated, the reagents or break-inducers herein contemplated for employment in the present process are old and well-known products. For convenience and for purpose of brevity, reference is made to the following three United States patents, to De Groote and Keiser, to wit, No. 2,324,488, No. 2,324,489, and No. 2,324,490, all dated July 20, 1943. Said patents are concerned with processes for breaking water-in-oil emulsions. The demulsifying agent employed is in each instance the resultant derived by reaction between a certain fractional ester and an acylated aminoalcohol. The aminoalcohols described collectively in the aforementioned three patents are used as reactants for combining with a fractional acidic ester. Thus said aminoalcohols must have present an alcoholiform hydroxyl as part of an acyl radical or as part of a substituent for an amino hydrogen atom. In the instant case, such aminoalcohols are not employed as reactants except as to salt formation reactions, and the hydroxyl group is not functional. Thus one may employ, not only the aminoalcohols described in the three aforementioned United States patents, but also the obvious analogs in which there is no hydroxyl radical present. Subsequent reference will be made to this particular type and examples will be included.

Aforementioned U. S. Patent 2,324,488 describes hydroxylated acylated amino-ether compounds, containing: (a) a radical derived from a basic hydroxyamino-ether, and said radical being of the kind containing at least one amino nitrogen free from attached aryl and amido-linked acyl radicals; said hydroxyamino-ether radical being further characterized by the presence of at least one radical derived from a basic hydroxyamine and being attached by at least one ether linkage to at least one radical selected from the class consisting of glycerol radicals, polyglycerol radicals, glycol radicals, polyglycol radicals, basic hydroxyamine radicals, amido hydroxyamine radicals, and aryl alkanolamine radicals; said basic hydroxyamino-ether radical being characterized by containing not more than 60 carbon atoms; and (b) an acyl radical derived from a detergent-forming monocarboxy acid having at least 8 carbon atoms and not more than 32 carbon atoms, said acylated amino-ether being additionally characterized by the fact that said aforementioned acyl radical is a substituent for a hydrogen atom of an alcoholic hydroxyl radical.

Aforementioned U. S. Patent 2,324,489 describes hydroxylated acylated monoamino compounds free from ether linkages, said hydroxylated acylated amino compounds being of the following type:

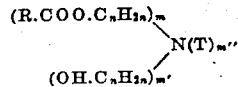

in which R.COO represents the oxy-acyl radical derived from a monobasic detergent-forming acid; T represents a member of the class consisting of hydrogen atoms, non-hydroxy hydrocarbon radicals, and acylated radicals, obtained by replacing a hydrogen atom of the hydroxyl group of an alkylol radical by the acyl radical of a monobasic carboxy acid having less than 8 carbon atoms; $n$ represents a small whole number which is less than 10; $m$ represents the numeral 1, 2, or 3; $m'$ represents the numeral 0, 1 or 2; and $m''$ represents the numeral 0, 1, or 2; with the proviso that $m+m'+m''=3$.

Aforementioned U. S. Patent 2,324,490 describes basic hydroxylated acylated polyamino compounds free from ether linkages, said compounds being of the following formula:

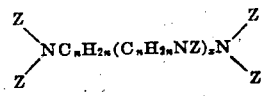

in which $n$ represents a small whole number varying from 2 to 10; $x$ is a small whole number varying from 0 to 10; Z is a member of the class consisting of H, RCO, R'CO, and D, in which RCO represents an acyl radical derived from a detergent-forming monocarboxy acid; R'CO is an acyl radical derived from a lower-molecular-weight carboxy acid having 6 carbon atoms or less; and D is a member of the class consisting of alkyl, hydroxyalkyl, aminoalkyl, and acyloxyalkylene, in which instance the acyl group is a member of the class consisting of RCO and R'CO; and the acylated polyamine is further characterized by the fact that there must be present a member of the class consisting of (a) acyloxyalkylene radical in which the acyl group is RCO; and (b) joint occurrence of an amino radical in which the acyl group is RCO and a hydroxyalkyl radical.

A description of certain high molal monocarboxy acids, and more particularly those commonly referred to as detergent-forming monocarboxy acids, appears in all three of the aforementioned U. S. patents. For convenience, the following description is substantially a verbatim form of the same subject-matter as it appears in U. S. Patent 2,324,490.

It is well-known that certain monocarboxy organic acids containing eight carbon atoms or more, and not more than 32 carbon atoms, are characterized by the fact that they combine with alkalis to produce soap or soap-like materials. These detergent-forming acids include fatty acids, resin acids, petroleum acids, etc. For the sake of convenience, these acids will be indicated by the formula R.COOH. Certain derivatives of detergent-forming acids react with alkali to produce soap or soap-like materials, and are the obvious equivalent of the unchanged or unmodified detergent-forming acids. For instance, instead of fatty acids one might employ the chlorinated fatty acids. Instead of the resin acids, one might employ the hydrogenated resin acids. Instead of naphthenic acids, one might employ brominated naphthenic acids, etc.

The fatty acids are of the type commonly referred to as higher fatty acids; and of course this is also true in regard to derivatives of the kind indicated, insofar that such derivatives are obtained from higher fatty acids. The petroleum acids include not only naturally-occurring naphthenic acids, but also acids obtained by the oxidation of wax, paraffin, etc. Such acids may have as many as 32 carbon atoms. For instance, see U. S. Patent No. 2,242,837, dated May 20, 1941, to Shields.

I have found that the composition of matter herein described and employed as the break-inducer of my process is preferably derived from unsaturated fatty acids having 18 carbon atoms. Such unsaturated fatty acids include oleic acid, ricinoleic acid, linoleic acid, linolenic acid, etc. One may employ mixed fatty acids, as for example, the fatty acids obtained from hydrolysis of cottonseed oil, soyabean oil, etc. My preferred break-inducer is obtained from unsaturated fatty acids, and more especially unsaturated fatty acids containing a hydroxyl radical, or unsaturated fatty acids which have been subjected to oxidation. In addition to synthetic carboxy acids obtained by the oxidation of paraffins or the like, there is the somewhat analogous class obtained by treating carbon dioxide or carbon monoxide, in the presence of hydrogen or an olefin, with steam or by causing a halogenated hydrocarbon to react with potassium cyanide and saponifying the product obtained. Such products or mixtures thereof, having at least 8 and not more than 32 carbon atoms and having at least one carboxyl group or the equivalent thereof, are suitable as detergent-forming monocarboxy acids; and another analogous class equally suitable is the mixture of carboxylic acids obtained by the alkali treatment of alcohols of high molecular weight formed in the catalytic hydrogenation of carbon monoxide.

As is well-known, one need not use the high molal carboxy acid, such as a fatty acid, for introduction of the acyl group or acyloxy group. Any suitable functional equivalent such as the acyl halide, the anhydride, ester, amide, etc., may be employed.

The break-inducer agent employed in the present process consists of an aminoalcohol ester as described; and particular attention is called to the fact previously noted, that although such esterified aminoalcohol need not contain a hydroxyl radical, my preferred form is the hydroxylated type. Other aminoalcohol esters of the kind herein contemplated are described in U. S. Patent 2,259,704, dated Oct. 21, 1941, to Monson and Anderson.

In light of what has been said, it hardly appears necessary to include a list of reactants and reagents derivable therefrom. However, for convenience, the following amines are included. Suitable primary and secondary amines, which may be employed to produce materials of the kind above described, include the following: diethanolamine, monoethanolamine, ethyl ethanolamine, methyl ethanolamine, propanolamine, dipropanolamine, propyl propanolamine, etc. Other examples include cyclohexylolamine, dicyclohexylolamine, cyclohexyl ethanolamine, cyclohexyl propanolamine, benzylethanolamine, benzylpropanolamine, pentanolamine, hexanolamine, octylethanolamine, octadecylethanolamine, cyclohexanolethanolamine, etc.

Similarly, suitable tertiary amines which may be employed include the following: triethanolamine, diethanolalkylamines such as diethanol ethylamine, diethanol propylamine, etc. Other examples include diethanol methylamine, tripropanolamine, dipropanol methylamine, cyclohexanol diethanolamine, dicyclohexanol ethanolamine, cyclohexyl diethanolamine, dicyclohexyl ethanolamine, dicyclohexanol ethylamine, benzyl diethanolbenzyl dipropanolamine, tripentanolamine, trihexanolamine, hexyl ethanolamine, octadecyl diethanolamine, etc.

Additional amines include ethanol diethylamine, propanol diethylamine, ethanol dipropylamine, propanol dipropylamine, ethanol dicyclohexylamine, cyclohexanol diethylamine, dibenzyl ethanolamine, etc. Ether-type amino-alcohols may be obtained from the above-mentioned amino-alcohols, for example by treating them with one or more moles of an oxyalkylating agent such as ethylene oxide, propylene oxide, butylene oxide, glycid, etc. It is to be noted that comparable products are obtained by treating primary or secondary amines other than arylamines with an olefin oxide. Aminoalcohols containing a primary or secondary amino group, i. e., having at least one or two amino hydrogen atoms present, may be employed under especially controlled conditions to give an ester rather than an amide. One procedure is to permit amidification to take place and then cause a rearrangement to the ester form. See U. S. Patent 2,151,788, dated March 28, 1939, to Mauersberger.

AMINOALCOHOL ESTER

*Example 1*

One pound mole of ricinoleic acid is reacted with one pound mole of triethanolamine at approximately 180° to 240° C. for approximately 10 to 25 hours until there is substantially complete esterification.

Example 2

Ricinoleic acid in the preceding example is replaced by methyl naphthenate.

Example 3

Methyl abietate is substituted for ricinoleic acid in Example 1 preceding.

Example 4

Ethyl oleate is substituted for ricinoleic acid in Example 1 preceding.

Example 5

One pound mole of triethanolamine is reacted with one pound mole of ethylene oxide and the etherized amine so obtained is substituted for triethanolamine in Examples 1 to 4 preceding.

Example 6

One pound mole of triethanolamine is reacted with two pound moles of ethylene oxide and the etherized amine so obtained is substituted for triethanolamine in Examples 1 to 4 preceding.

Example 7

One pound mole of triethanolamine is reacted with three pound moles of ethylene oxide and the etherized amine so obtained is substituted for triethanolamine in Examples 1 to 4 preceding.

Example 8

One pound mole of triethanolamine is reacted with 4 to 6 pound moles of ethylene oxide and the etherized amine so obtained is substituted for triethanolamine in Examples 1 to 4 preceding.

Example 9

One pound mole of ethanol diamylamine obtained by reacting one pound mole of diamylamine with one pound mole of ethylene oxide is employed in place of triethanolamine in Examples 1 to 4 preceding.

Example 10

The same procedure is employed as in the preceding example except that an etherized amine is obtained by treating diamylamine with 2, 3, or 4 moles of ethylene oxide and such etherized amine is employed instead of ethanol diamylamine.

Example 11

One pound mole of castor oil is reacted with 3 pound moles of triethanolamine as described in aforementioned U. S. Patent 2,324,489 under the heading, "Intermediate hydroxylated amine, Example 1."

Example 12

The same procedure is followed as in the preceding example except that either one pound mole or two pound moles of glycerol are added to the reaction mass consisting of one pound mole of castor oil and three pound moles of triethanolamine.

Example 13

The resultants obtained in Examples 1 to 4 preceding are treated with equal molal ratios of an olefin oxide.

Example 14

One follows the directions of U. S. Patent 2,293,494, to De Groote and Keiser, dated Aug. 18, 1942, to produce an amine of the following composition:

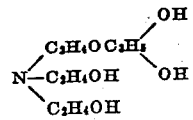

Such amine is substituted for triethanolamine in the preceding examples.

Example 15

One pound mole of hydroxyethyl ethylenediamine is reacted with 4 moles of ethylene oxide to give the corresponding tetrahydroxylated derivative. Such compound is employed in place of triethanolamine in the preceding examples.

Example 16

The same procedure is followed as in the preceding example except that 5 to 8 moles of ethylene oxide are employed instead of 4 moles.

Example 17

The same procedure is employed as in the preceding example except that diethylenetriamine is substituted for ethylenediamine.

Example 18

Amines of the following composition:

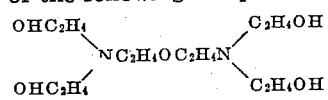

and

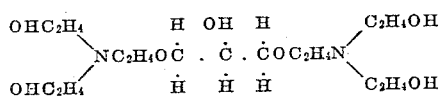

are substituted for ethylenediamine in the preceding examples.

Example 19

In the preceding examples, where more than one high molal acyl radical can be employed, two ricinoleyl radicals or the equivalent are introduced into the polyamino-alcohol.

Example 20

Unsymmetrical diphenyl diethylenetriamine is treated with ethylene oxide and substituted for oxyethylated ethylenediamine in the preceding examples.

Example 21

Symmetrical diacetyl triethylenetetramine is treated with 4 moles of ethylene oxide and substituted for oxyethylated ethylenediamine in the preceding examples.

Examples 22

Additional examples are prepared in the manner previously described except that one employs aminoalcohols obtained by the oxyalkylation of morpholine; 1,3-diamino-2-propanol; 2-amino-1-butanol; 2-amino-2-methyl-1-propanol; 2-amino-2-methyl-1,3-propanediol; 2-amino-2-ethyl-1,3-propanediol; tris-(hydroxymethyl) aminomethane; or piperidine. One may use enough of the olefin oxide, for instance ethylene oxide, to convert all amino hydrogen atoms into hydroxyethyl radicals, or one may employ a greater amount so as to introduce ether linkages in addition.

Example 23

The same procedure is followed as in Example 22 preceding except that one employs the amines described in Examples 9, 10, 11, and 13 of U. S. Patent 2,306,329, to De Groote and Keiser, dated Dec. 22, 1942.

*Example 24*

Soyabean oil, blown soyabean oil, blown castor oil, or blown teaseed oil is substituted for castor oil in the preceding examples.

In the above examples it is obvious that free hydroxyl radicals may be present as part of a hydroxyalkyl radical or as part of the acyl radical of a fatty acid such as ricinoleic acid.

Some of the acylated amino-bodies contemplated for use in my process are freely dispersible in water in the free state. Presumably such systems comprise the reagent in the form of a base, i. e., a substituted ammonium compound. In other instances, the free forms of the reagents are substantially water-insoluble but the salt forms (e. g., the acetates) are very water-dispersible. In some such intances, therefore, it is more desirable to employ the reagent in the form of one of its salts. I have found, for example, that the acetate, hydroxyacetate, lactate, gluconate, propionate, caprate, phthalate, fumarate, maleate, benzoate, succinate, oxalate, tartrate, chloride, nitrate, or sulfate, prepared by addition of the suitable acid to the acylated amino body, constitutes a reagent which is usually somewhat more soluble or disperible in water than the original acylated amino body, and which is, if anything, slightly more effective than the simple acylated amino body, when used in my process. In such intances where the simple acylated amino body is not particularly water-dispersible, it may still be possible to employ it in free form and without preparing a salt form, by using some non-aqueous solvent, such as aromatic petroleum solvent, instead of water. It is to be understood that references to the reagents in these specifications and claims include the amino bodies in basic form and in the form of salts of acids, as well as the amino bodies themselves.

As an example of a preferred type of reagent which is effective for use in my process, the following is submitted: I prepare a mixture of di-amino and triamino materials which correspond essentially to either one of the two following type forms:

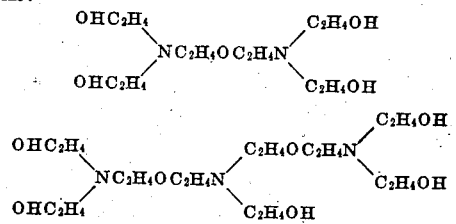

After determining the average molecular weight of such mixture, I combine the same with castor oil in the proportion of 1 pound mole of castor oil for 3 pound moles of the mixed amines, "pound mole" in the latter case being calculated on the average molecular weight as determined. Such mixture is heated to approximately 160–260° C. for approximately 6 to 25 hours, until reaction is complete, as indicated by the disappearance of all of the triricinolein present in the castor oil. The finished product may be used as such, but because of its appreciable viscosity it may be desirable to mix it with any desired proportion of water or other solvent. I have found, for example, that a mixture of 20 parts of the above reagent and 80 parts of water has physical properties which are in some respects superior to those of the concentrated material.

As stated above, the material may be employed in the concentrated form or it may be diluted with a suitable solvent. I have frequently found water to constitute a satisfactory solvent, because of its availability and negligible cost; but in some cases I have used non-aqueous solvents, such as aromatic petroleum solvent, in preparing reagents which were effective when used for the purpose of inducing a break in doctor treating. Depending on the choice of acylated amino body and its molecular weight, the solubility may be expected to range from ready water-solubility in the free state to substantial water-insolubility. As stated above, the salts, and specifically the acetates, generally show improved water-solubility over the simple acylated amino bodies; and I have in some instances obtained the best results by using salt forms of the acylated amino bodies which possess appreciable water-solubility. Because such reagents are effective in proportions of the order of 10 to 100 parts per million, their solubility in the treating system may be entirely different from their apparent solubility in bulk, in water or oil. Undoubtedly, they have some solubility in both media, within the concentration range employed. Such salts may in some cases be oil-soluble and therefore particularly adapted for use where it is desirable to dissolve the break inducer in the hydrocarbon oil which is being sweetened.

In summary, attention is directed to the fact that the amino compounds herein contemplated may be monoamino or polyamino in type. They may or may not have a free hydroxyl radical present. There must be present at least one occurrence of the radical

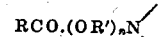

in which RCO is the acyl radical of a monocarboxy detergent-forming acid having at least 8 and not more than 32 carbon atoms, and the amino nitrogen atom must be basic, i. e., free from direct linkage with an unsaturated or negative radical such as an acyl radical or an aryl radical. The R' is an alkylene radical having at least two and not more than 10 carbon atoms, and preferably 2, 3, or 4 carbon atoms. The alkylene radical may be considered as being derived from an olefin oxide such as those previously mentioned. Additional reactive olefin oxides are described in U. S. Patent 2,208,581, to Hoeffelman, and dated July 23, 1940, and include among others glycid hexylene oxide, decene oxide, etc. The character $n$ indicates a number varying from 1 to 10 but preferably from 1 to 4. Recurrences of R' need not be the same. For instance, one mole of triethanolamine might be reacted with three moles of ethylene oxide, and the resultant product so obtained may be reacted with three moles of butylene oxide. The aminoalcohol so obtained could be esterified in the manner previously described. It is obvious, of course, that where $n$ is 2 or more, the product is in essence an esterified aminoetheralcohol, the expression etheralcohol being frequently applied to alcohols where a carbon atom chain is interrupted at least once by an oxygen atom. Ether linkages may appear in other positions, where there is no direct union with RCO.

The simplest compound herein contemplated is the octenoic acid ester of ethanol dimethylamine. On the other hand, one may have polyamino compounds having 4, 5, or 6 amino nitrogen atoms and containing in addition as many as 4 acyl radicals derived from high molal acids having as many as 32 carbon atoms. Thus, the molecular weight range of the monomeric form may vary from 213 to 10 or 20 times such value. The ease with which heat polymerization of polyhydric alcohols and polyhydric aminoalcohols takes place suggests that condensation polymers obtained by etherization may have a substantially higher molecular weight.

Reference has been made to the use of glycid, epichlorhydrin, etc., as an oxyalkylating agent. Reference has also been made to reactions which involve etherization in which glycerol appears as a reactant. Thus, R', previously referred to as being an alkylene radical, such as ethylene, propylene, etc., obviously includes radicals obtained from glycerol or glycid, i. e., the hydroxy propylene radical. Hence, in the hereto appended claims, reference to the propylene radical, either generically or specifically, is intended to include the hydroxy propylene radical as well.

Attention is directed to the fact that in the hereto appended claims, the proviso that an ether linkage be present does not means that the ether linkage must necessarily occur in the radical by which the acyl radical RCO is joined to the nearest basic nitrogen atom. For instance, compare the last two previous formulas preceding and note that the introduction of an acyl radical is such that the acyloxy radical is joined to, or united to, a basic amino nitrogen atom by an uninterrupted carbon atom chain. Thus, reference in the hereto appended claims to an ether radical includes both types of either linkages, i. e., the type where the ether linkage is part of the radical linking RCO to the nearest basic amino nitrogen atom and in such instances where the ether radical does not represent part of the linking radical which unites RCO to the nearest basic amino nitrogen atom.

The compound herein disclosed are preferably used as the sole break inducer for the doctor treatment, in which event the quantity of elementary sulfur employed in the doctor treatment is not in excess of the theoretical amount required to convert the mercaptans. In this preferred operation, where no appreciable excess of sulfur is used in the doctor treatment, there is effected a faster break than can be obtained by means of other break inducers and frequently a break is effected where one might not be otherwise obtainable. Additionally, there is recovered a distillate which is free of excess sulfur, an important advantage as has already been indicated.

However, the invention is not limited to the use of the organic compounds referred to as the sole break inducer but they may be employed in conjunction with other substances having a like property, such as elementary sulfur. In operations of this type, a small excess of sulfur would be used in the doctor treatment, the excess functioning with the compounds of this invention to bring about the desired break in the treatment. The advantages of such operation are that relatively little sulfur is required, the break is induced very rapidly, and frequently a break is effected where one cannot be obtained at all by means of sulfur alone.

As to the preferred operation above indicated, it will be observed that the doctor treatment differs from that heretofore employed in that the quantity of elementary sulfur added is only the theoretical amount based on stoichiometrical calculations, or other comparable test, to convert mercaptans to disulfides and other innocuous compounds, there being present during the treatment no excess of sulfur capable of completely or partially acting as a break inducer. Elementary sulfur, if present in sufficient excess in the sweetened distillate, can be detected by the doctor test with the addition of a mercaptan such as ethyl or butyl mercaptan. For instance, a sweetened gasoline containing an excess of elementary sulfur no longer shows positive in the doctor test. However, if there is a slight excess of elementary sulfur present, this elementary sulfur can be detected by the addition of butyl mercaptan or the like, followed by a doctor test on the admixture. A large excess may be indicated by the less sensitive copper strip test.

The butyl mercaptan test, referred to above, is commonly used in a qualitative manner to detect excess elementary sulfur. This test is described in the Universal Oil Products Co. Bulletin No. 22, p. 15, as follows:

"In doctor sweetening, the most important factor in securing inhibitor effectiveness, is to use the smallest possible amount of sulfur. Sulfur addition may be controlled by testing with mercury or butyl mercaptan. In making the butyl mercaptan test, a sample of gasoline drawn from the doctor plant after it has left the mixers is allowed to stand until the lead sulfide has settled, and 30 cc. filtered into a 4 ounce oil sample bottle. 20 cc. of a 1 to 1,400 solution of butyl mercaptan is added and 10 cc. of doctor solution. The mixture is shaken for 15 seconds and observed. The sample should be green-yellow. It will slowly become opaque but should remain yellow in color even if observed for 30 minutes. If it turns orange or brown, excess sulfur has been used, and on addition of inhibitor the gasoline will have lower induction period and higher copper dish gum than would have resulted had less sulfur been used."

The chemistry of the reactions which enter into doctor sweetening is rather complex and not completely understood. However, it is common practice, for the purpose of calculating the amount of sulfur necessary, to use the following reaction as being representative:

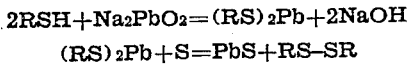

wherein R represents the hydrocarbon group of a mercaptan or disulfide.

The amount of sulfur required for completion of these reactions may be calculated from the original mercaptan content of the distillate. With some distillates, the sweetening reaction appears to lead to the formation of stable trisulfides, rather than disulfides. In this case the reactions presumably proceed as follows:

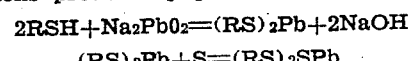
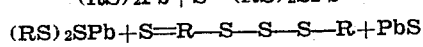

With distillates where these reactions take place, the theoretical sulfur requirement may be calculated by use of the above equations and the known original mercaptan content of the distillate. However, for all practical purposes, the butyl mercaptan test, previously described, may be used as a test for whether or not excess sulfur has been used. Accordingly, the term "negative to the butyl mercaptan test," as applied to sweetened distillates, is used herein to mean that a distillate has been sweetened with the theoretical amount of sulfur, or that the minimum amount of sulfur necessary for completion of the sweetening reaction has been employed. The reason for this is that the butyl mercaptan test may be made more easily and more quickly than a determination of the actual course or nature of the sweetening reactions.

As is understood, of course, if hydrogen sulfide is present, allowance must be made for the amount of lead required to remove such sulfide. However, this is not apt to be a factor requiring consideration, due to usual preliminary removal of hydrogen sulfide.

In view of what has been said previously, it is obvious that the satisfactory application of the doctor treatment must involve a rapid and complete separation of lead sulfide and associated insoluble material, as soon as the mercaptans are converted into disulfides or other more innocuous compounds. Although the above reactions indicate only precipitation of lead sulfide, it has been found that in reality a precipitate may contain a comparatively small amount of lead sulfide; and there may also be present various complex materials, part of which at least are organic in nature and may represent basic mercaptides. The equations indicate that the amount of elementary sulfur to be added per pound of combined sulfur present as mercaptan should be in the ratio of one-half to one. In actual practice, however, with the conventional doctor treatment, the quantity of sulfur added for complete reaction, and particularly to give subsidence or settling of the black precipitate, is not so definite. As a matter of common practice, sulfur is added in the conventional doctor treatment for two distinct purposes of converting mercaptans and inducing the break; and these two purposes must be fully appreciated in order to understand the benefit obtained by applying the improved procedure which constitutes my present invention, particularly in its preferable form, i. e., where the complex organic compounds herein described are used as the sole break inducer, with only the theoretical amount of sulfur to convert mercaptans or to give a negative butyl mercaptan test.

It has heretofore been proposed to employ water-soluble soaps to effect the break in doctor treatment, the soaps being utilized in ratios of 1 to 2500 or 1 to 7500. At such ratios, the common soaps are often ineffective and hence there is the tendency to employ just as much sulfur as if no soap had been added. In contradistinction to the common soaps heretofore contemplated, the break inducers of the present invention are invariably effective and invariably enable a marked reduction in the amount of sulfur needed in the doctor treatment, even to the extent, as in the preferred embodiment already described, of limiting the sulfur to the theoretical amount necessary for converting the mercaptans into innocuous compounds.

The break inducers of this invention need to be used in only very minute quantities, for example, in ratios varying from 1 to 5000 or 1 to 7500 to even less than 1 to 75,000, based on recovered or sweetened gasoline or other distillate treated. To the extent that my improved break inducers possess the property of forming oil-in-water emulsions, it should be observed that they are employed in such insignificant quantities that they do not exhibit any detectable or appreciable emulsifying action.

Although my invention can be applied to any variation of the conventional doctor treatment in a manner which is most convenient under the specific conditions surrounding the particular operation, for purposes of brevity, I will describe only the preferable form of procedure, i. e., where the herein disclosed organic compounds are used as sole break inducers. It is obvious, however, that those skilled in the art and acquainted with such procedure could readily modify the conventional doctor treatment in which elementary sulfur is used as a break inducer, so as to reduce the amount of sulfur employed, and offset that reduction by suitable quantities of the break inducers of this invention.

In a continuous doctor sweetening plant, the organic break inducer may be added continuously to the stream of sour distillate prior to its admixture with doctor solution and sulphur. When the break inducer is a liquid, this is conveniently done by means of a small injector pump adjusted to deliver the break inducer in some definite, desired amount, usually within the limits of one part per 7500 to 75,000 parts of gasoline. After the introduction of break inducer has begun, the amount of sulfur added to the distillate, or to the mixture of distillate and doctor solution, is decreased to the theoretical amount.

In batch system doctor sweetening plants, the required amount of break inducer may be introduced into the sour distillate and mixed thoroughly before the treatment with doctor solution and sulfur. In this case, also, the amount of sulfur used is reduced to the theoretical amount.

Sometimes better results are obtained if the break inducer is added to the doctor solution or to the distillate after the latter has been mixed with doctor solution and sulfur. Regardless of the point of introduction of the break inducer, however, the amount of sulfur required for completion of the sweetening reactions and subsidence of the black precipitate is reduced to, or nearly to, the theoretical amount.

In one application of my process, some 500 bbl. of gasoline were being treated with approximately 50 bbl. of conventional doctor solution, daily. In the treatment, the average daily loss of gasoline in the black strap was approximately 10 bbl. By introducing one pint of a reagent comprising the material above described, into the stream of doctor solution just before it contacted the gasoline stream, it was found that the break was so facilitated that substantially no loss of gasoline in the black strap was observed. Furthermore, the consumption of sulfur over a period of months was found to be only a fraction of the volume formerly consumed, the sulfur saving approaching one-half the amount which had been required in absence of the break inducer. The lead susceptibility of the gasoline was also found to be improved as a result of such use of break inducer, which fact is a natural consequence of using less sulfur, and especially of avoiding an excess of sulfur. In this installation, the reagent was introduced into the stream by means of a small electrically-driven proportioning pump, the reagent feed being continuous. The savings resulting from the use of my process in this installation are believed to approximate ¾ cent per barrel of gasoline treated.

The doctor solution used for sweetening is generally regenerated after each use and employed for sweetening further amounts of sour distillate. Where the break inducer has been added to the doctor solution, its activity may persist thru one or more regenerations, but eventually further amounts will have to be added. The number of volumes of distillate sweetened per volume of break inducer used in the doctor solution usually will be more than 7500, and the ratio of break inducer may average one part to 25,000 parts sweetened distillate.

I have previously indicated that the amount of added break inducer may be less than one part in 75,000 parts of the oil being sweetened. In practice, however, the amount of break inducer actually present in the oil may be even less than this during certain phases of the process. For example, in an operation involving recirculation of doctor solution, the ratio of break inducer in the first batch of oil may not exceed one to 30,000 or even one to 45,000 but recycling of the doctor solution once or twice, without further addition of break inducer, may result in an actual ratio of 1–80,000 or 1–90,000 or even a ratio of less than 1–100,000 in subsequent batches of oil. Therefore it is to be understood that the heretofore mentioned ratio of 1–75,000 is not the upper limit of effectiveness, particularly in a recirculation process.

It will be further understood that, instead of employing a single break inducer of the kind herein disclosed, a mixture of two or more of them may be used, if desired. Indeed, the process of manufacture may result in the production of a mixture of a number of break-inducing compounds rather than a single compound in a technically or chemically pure state. Moreover, a break inducer of this invention may be employed in admixture with other types of break inducers.

Frequently, the compounds of this invention have beneficial effects in addition to bringing about rapid subsidence. For example, as a result of their use, the amount of "black strap" or feathery material appearing at interfacial surfaces may be greatly diminished or entirely eliminated.

It is to be understood that the detailed disclosures herein are for illustrative purposes only and are not to be considered as limitations on the invention, inasmuch as various modifications within the scope of the appended claims will be apparent to those skilled in the art.

Having described my invention, I claim:

1. In the sweetening of sour hydrocarbon oils by treatment with doctor solution and elementary sulfur, the method of inducing a break in the doctor treatment which comprises adding to the system a relatively small amount of a reagent comprising a basic acylated aminoalcohol in which there is at least one occurrence of the radical

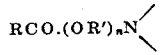

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from one to 10; and the molecular weight of said compound in monomeric form being at least 213 and not over 4,000; said amino compound being selected from the class consisting of the anhydro base, the hydrated base, and salts, and said amino compound being added in an amount less than 0.02% of the hydrocarbon oil being sweetened.

2. A method of sweetening hydrocarbon oils containing mercaptans which comprises treating the oil with doctor solution and sufficient elementary sulfur to convert the mercaptans into innocuous compounds, and inducing a break in said treatment by the addition of a reagent comprising a basic acylated aminoalcohol in which there is at least one occurrence of the radical

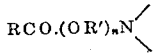

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from one to 10; and the molecular weight of said compound in monomeric form being at least 213 and not over 4,000; said amino compound being selected from the class consisting of the anhydro base, the hydrated base, and salts, and said amino compound being added in an amount less than 0.02% of the hydrocarbon oil being sweetened.

3. A method of sweetening hydrocarbon oils containing mercaptans which comprises treating the oil with doctor solution and a quantity of elementary sulfur not appreciably in excess of the theoretical amount required to convert the mercaptans into innocuous compounds, and inducing a break in said treatment by the addition of a reagent comprising a basic acylated aminoalcohol in which there is at least one occurrence of the radical

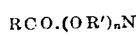

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from one to 10; and the molecular weight of said compound in monomeric form being at least 213 and not over 4,000; said amino compound being selected from the class consisting of the anhydro base, the hydrated base, and salts, and said amino compound being added in an amount less than 0.02% of the hydrocarbon oil being sweetened.

4. A method of sweetening hydrocarbon oils containing mercaptans which comprises converting the mercaptans into innocuous compounds by treatment of the oil with alkaline plumbite solution and elementary sulfur, the amount of sulfur being insufficient to render the oil positive to the butyl mercaptan test and insufficient to effect settling or subsidence, and inducing a break in said treatment by adding a reagent comprising a basic acylated aminoalcohol in which there is at least one occurrence of the radical

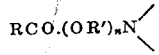

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from one to 10; and the molecular weight of said compound in monomeric form being at least 213 and not over 4,000; said amino compound being selected from the class consisting of the anhydro base, the hydrated base, and salts, and said amino compound being added in an amount less than 0.02% of the hydrocarbon oil being sweetened.

5. In sweetening of sour hydrocarbon oils by treatment with doctor solution and elementary sulfur, the method of inducing a break in the doctor treatment which comprises adding to the system in a ratio between 1 to 5,000 and 1 to 75,000, a reagent comprising a basic acylated aminoalcohol in which there is at least one occurrence of the radical

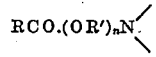

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from one to 10; and the molecular weight of said compound in monomeric form being at least 213 and not over 4,000; said amino compound being selected from the class consisting of the anhydro base, the hydrated base, and salts.

6. In the sweetening of sour hydrocarbon oils by treatment with doctor solution and elementary sulfur, the improvement which comprises facilitating the break in said treatment by the addition of a reagent comprising a basic acylated aminoalcohol in which there is at least one occurrence of the radical

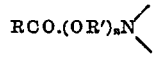

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; and $n$ is a small whole number varying from one to 10; and the molecular weight of said compound in monomeric form being at least 213 and not over 4,000; said amino compound being selected from the class consisting of the anhydro base, the hydrated base, and salts, and said amino compound being added in an amount less than 0.02% of the hydrocarbon oil being sweetened.

7. In the sweetening of sour hydrocarbon oils by treatment with doctor solution and elementary sulfur, the improvement which comprises facilitating the break in said treatment by the addition of a reagent comprising a basic acylated aminoalcohol in which there is at least one occurrence of the radical

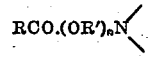

in which RCO is the acyl radical of a monocarboxy detergent-forming acid having at least 8 and not more than 32 carbon atoms; the amino nitrogen atom is basic; R' is an alkylene radical having at least 2 and not more than 10 carbon atoms; $n$ is a small whole number varying from one to 10; the reagent containing more than one basic amino nitrogen atom per monomer; the molecular weight of said compound in monomeric form being at least 213 and not over 4,000; said amino compound being selected from the class consisting of the anhydro base, the hydrated base, and salts, and said amino compound being added in an amount less than 0.02% of the hydrocarbon oil being sweetened.

8. The process of claim 1 wherein the reagent contains at least 2 and not more than 4 basic amino nitrogen atoms per monomer.

9. The process of claim 1 wherein the reagent contains at least 2 and not more than 4 basic amino nitrogen atoms and at least one free hydroxyl radical per monomer.

10. The process of claim 1 wherein the reagent contains at least 2 and not more than 4 basic amino nitrogen atoms and a plurality of free hydroxyl radicals per monomer.

11. The process of claim 1 wherein the reagent contains at least 2 and not more than 4 basic amino nitrogen atoms, a plurality of free hydroxyl radicals, and at least one ether radical per monomer.

12. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer.

13. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; and wherein RCO is a higher fatty acid acyl radical.

14. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; and wherein RCO is a higher fatty acid acyl radical having 18 carbon atoms.

15. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; and wherein RCO is an unsaturated higher fatty acid acyl radical having 18 carbon atoms.

16. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; and wherein RCO, occurring only once per monomer, is an unsaturated higher fatty acid acyl radical having 18 carbon atoms.

17. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; wherein RCO, occurring only once per monomer, is an unsaturated higher fatty acid acyl radical having 18 carbon atoms; and wherein the value of $n$ is unity.

18. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; wherein RCO, occurring only once per monomer, is an unsaturated higher fatty acid acyl radical having 18 carbon atoms; and wherein the value of $n$ is unity and R' is an alkylene radical having at least 2 and not more than 3 carbon atoms.

19. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; wherein RCO, occurring only once per monomer, is an unsaturated higher fatty acid acyl radical having 18 carbon atoms; wherein the value of $n$ is unity and R' is an alkylene radical having at least 2 and not more than 3 carbon atoms; and wherein the monomeric molecular weight is less than 1,000.

20. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; wherein RCO, occurring only once per monomer, is a ricinoleyl radical; wherein the value of $n$ is unity and R' is an alkylene radical having at least 2 and not more than 3 carbon atoms; and wherein the monomeric molecular weight is less than 1,000.

21. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; wherein RCO, occurring only once per monomer, is an oleyl radical; wherein the value of $n$ is unity and R' is an alkylene radical having at least 2 and not more than 3 carbon atoms; and wherein the monomeric molecular weight is less than 1,000.

22. The process of claim 1 wherein the reagent contains at least 2 and not more than 4 basic amino nitrogen atoms, a plurality of free hydroxyl radicals, and at least one ether radical in a position other than part of the divalent linking radical which unites RCO with the nearest basic amino nitrogen atom, per monomer; wherein RCO, occurring only once per monomer, is a linoleyl radical; wherein the value of $n$ is unity and R' is an alkylene radical having at least 2 and not more than 3 carbon atoms; and wherein the monomeric molecular weight is less than 1,000.

CLARENCE S. MORRIS.